No. 756,639. PATENTED APR. 5, 1904.
J. C. HUTCHISON.
MACHINE FOR MAKING PIES.
APPLICATION FILED NOV. 9, 1903.
NO MODEL.
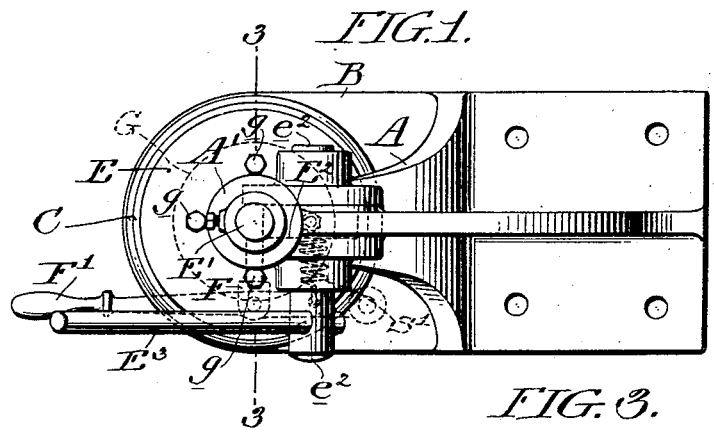
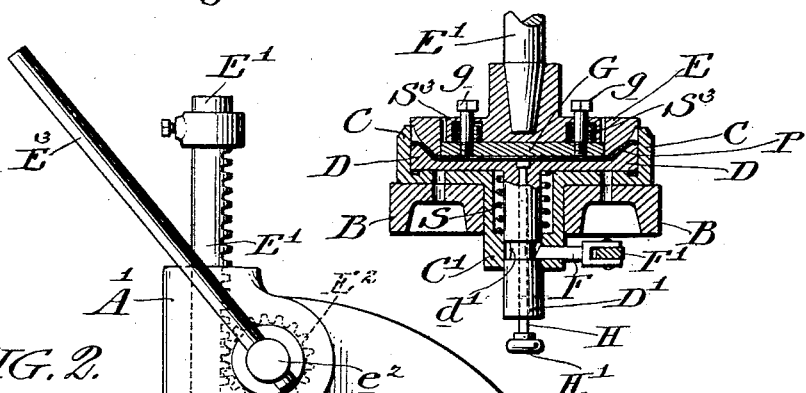
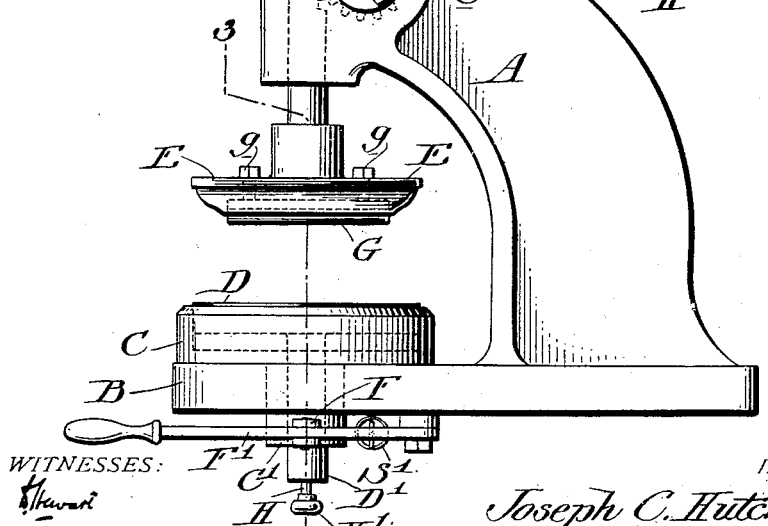
WITNESSES:
INVENTOR.
Joseph C. Hutchison
BY
ATTORNEY.

No. 756,639.
Patented April 5, 1904.

UNITED STATES PATENT OFFICE.

JOSEPH C. HUTCHISON, OF PHILADELPHIA, PENNSYLVANIA.

MACHINE FOR MAKING PIES.

SPECIFICATION forming part of Letters Patent No. 756,639, dated April 5, 1904.

Application filed November 9, 1903. Serial No. 180,322. (No model.)

*To all whom it may concern:*

Be it known that I, JOSEPH C. HUTCHISON, a citizen of the United States, residing at Philadelphia, in the county of Philadelphia and State of Pennsylvania, have invented certain new and useful Improvements in Machines for Making Pies, of which the following is a specification.

My invention contemplates a machine by which a lump or cake of dough may be pressed or molded into the form of a pie-crust, which has simultaneously formed upon its outer edge a tapered rim projecting upward some distance above the pie-plate, this form of crust being the one preferred in the making of custard pies, which are usually filled after they are placed in the oven.

My invention will be more fully understood by reference to the accompanying drawings, forming part of this specification, and in which—

Figure 1 represents a plan view of the machine; Fig. 2, a side elevation; and Fig. 3, a vertical section of the lower and more essential part of my machine, the section being taken on the line 3 3 of Figs. 1 and 2.

Referring to the reference-letters of the drawings, A represents the frame of the machine; B, the bed-plate; C, the rim-die; D, the plate-holder, and E the plunger. The plunger E is provided with a toothed rod E', which is guided in a bearing A' of the frame and which is operated by a pinion E", fastened to a stud $e^2$. This stud may be operated by power, as practiced in many well-known forms of presses, or, as shown in the drawings, by a hand-lever E³.

The rim-die C is made in the form of a flanged plate, in which is guided the plate-holder D, which has a depending stem D' passing through and guided in a hub C', formed at the base of the rim-die, which is fastened in the bed-plate B. The hub of the rim-die is counterbored to receive a spring S, which normally acts to raise the plate-holder to a level with the top of the rim-die.

Prior to the pressing operation the plate-holder is provided with a plate P, containing a cake of dough, which by the joint action of the plunger, rim-die, and plate-holder is molded into the form of a crust provided with a tapered rim projecting above the upper edge of the plate P. After this rimmed crust has been formed it is desirable that the plate-holder, which during the molding operation has been pressed downward, should remain in that position until the plunger E is withdrawn, and in order to accomplish this I provide the stem D' with a groove $d'$ to receive a latch F, which is connected to a lever F', operated to cause the latch to engage the groove by a spring S'. This enables the delicate rim of the crust to be supported by the inner wall of the rim-die, thus preserving its shape while the plunger is being removed.

To prevent the crust from adhering to the plunger and being lifted as the plunger rises, I provide the plunger with a stripper G, made in the form of a circular plate set into an opening in the plunger and supported by stud-bolts $g$ $g$, around which are coiled springs S² S³, normally pressing the plate outward.

The effect of the stripper is to practically enable one part of the plunger to be removed from the crust before the other part is removed, and by this means the partial vacuum between the crust and plunger is destroyed and further adhering of the crust to the plunger is prevented. The plunger having been lifted to the full extent of its movement, the plate-holder will rise under the influence of the spring S by withdrawing the latch F, and the plate will be lifted on a level with the rim-die C. To lift the plate from the plate-holder, I employ an ejector H in the form of a light rod passing through an opening in the stem D', which rod may be manually operated by a knob H'.

The form of my invention which I have chosen to describe and illustrate is one which by thorough practical demonstration has proven to give good result. It will be understood, however, that I do not confine myself to the specific construction described and illustrated except in such claims as relate to the specific construction, as modifications other than what I have here shown may be made without departing from the scope of my invention.

Having described my invention, what I claim, and desire to secure by Letters Patent, is—

1. A machine of the character specified, comprising a rim-die, a movable plate-holder, and a plunger adapted to coact with the rim-die and plate-holder to mold and rim a pie-crust, substantially as specified.

2. A machine of the character specified, comprising a rim-die, a plate-holder located and guided with the same, a plunger adapted to coact with the above-mentioned parts to form a crust and a stripper adapted to release the crust from the plunger, substantially as specified.

3. A machine of the character specified, comprising a rim-die, a plate-holder, a plunger, a stripper guided upon said plunger and an ejector guided within the plate-holder, substantially as specified.

4. A machine of the character specified, comprising a rim-die, a plate-holder, means for operating the plate-holder, a plunger and means for operating the plunger, substantially as specified.

5. A machine of the character specified, comprising a rim-die, a plate-holder, a spring for raising the plate-holder, a latch for holding the plate-holder in a depressed position and a plunger adapted to coact with the rim-die and plate-holder to form a crust, substantially as specified.

6. A machine of the character specified, comprising a rim-die, a plate-holder, a spring for raising the plate-holder, a latch adapted to engage and to be disengaged from the plate-holder, a plunger, a stripper guided within the plunger, spring means for operating said stripper and an ejector guided within the plate-holder, substantially as specified.

In testimony whereof I affix my signature in presence of two witnesses.

JOSEPH C. HUTCHISON.

Witnesses:
DAVID S. WILLIAMS,
ARNOLD KATZ.